(12) United States Patent
Mekkat et al.

(10) Patent No.: US 10,853,078 B2
(45) Date of Patent: Dec. 1, 2020

(54) METHOD AND APPARATUS FOR SUPPORTING SPECULATIVE MEMORY OPTIMIZATIONS

(71) Applicant: Intel Corporation, Santa Clara, CA (US)

(72) Inventors: Vineeth Mekkat, San Jose, CA (US);
Mark Dechene, Hillsboro, OR (US);
Zhongying Zhang, Portland, OR (US);
John Faistl, Hillsboro, OR (US);
Janghaeng Lee, San Jose, CA (US);
Hou-Jen Ko, Sunnyvale, CA (US);
Sebastian Winkel, Los Altos, CA (US);
Oleg Margulis, Los Gatos, CA (US)

(73) Assignee: INTEL CORPORATION, Santa Clara, CA (US)

(*) Notice: Subject to any disclaimer, the term of this patent is extended or adjusted under 35 U.S.C. 154(b) by 46 days.

(21) Appl. No.: 16/231,313

(22) Filed: Dec. 21, 2018

(65) Prior Publication Data

US 2020/0201645 A1 Jun. 25, 2020

(51) Int. Cl.
*G06F 9/312* (2018.01)
*G06F 9/40* (2006.01)
*G06F 9/44* (2018.01)
*G06F 9/38* (2018.01)
*G06F 9/30* (2018.01)
*G06F 8/41* (2018.01)

(52) U.S. Cl.
CPC ........ *G06F 9/3838* (2013.01); *G06F 9/30043* (2013.01); *G06F 9/30065* (2013.01); *G06F 8/433* (2013.01); *G06F 8/443* (2013.01); *G06F 9/3836* (2013.01)

(58) Field of Classification Search
CPC .. G06F 9/3836; G06F 9/3838; G06F 9/30043; G06F 9/3865; G06F 9/3855; G06F 9/3857; G06F 9/3867; G06F 9/3814; G06F 9/382; G06F 9/30065; G06F 8/433; G06F 8/443
USPC .......................... 712/216–219; 717/151, 153
See application file for complete search history.

(56) References Cited

U.S. PATENT DOCUMENTS

| | | | |
|---|---|---|---|
| 8,239,638 B2 * | 8/2012 | Gunna | G06F 12/0833 710/39 |
| 2012/0089807 A1 * | 4/2012 | Rupley | G06F 9/384 711/203 |
| 2015/0095588 A1 * | 4/2015 | Abdallah | G06F 9/30047 711/137 |
| 2017/0185404 A1 * | 6/2017 | Mekkat | G06F 9/3826 |

\* cited by examiner

*Primary Examiner* — Daniel H Pan
(74) *Attorney, Agent, or Firm* — NDWE, LLP

(57) ABSTRACT

A processor includes a store buffer to store store instructions to be processed to store data in main memory, a load buffer to store load instructions to be processed to load data from main memory, and a loop invariant code motion (LICM) protection structure coupled to the store buffer and the load buffer. The LPT tracks information to compare an address of a store or snoop microoperation with entries in the LICM and re-loads a load microoperation of a matching entry.

20 Claims, 18 Drawing Sheets

| Before LICM | After LICM |
|---|---|
| ...<br>L1:<br>    CMIT<br>    LD [A]<br>    ...<br>    L0:<br>        CMIT<br>        LD [B]<br>        LD [C]<br>        ...<br>        ST [D]<br>        JCC L0<br>    ...<br>    ST [E]<br>    JCC L1 | ...<br>LD.L.1 [A]<br>L1:<br>    CMIT<br>    LD.L.0 [B]<br>    LD.L.0 [C]<br>    L0:<br>        CMIT<br>        ...<br>        ST.LCHK [D]<br>        JCC L0<br>    LCLEAR.0<br>    ...<br>    ST.LCHK [E]<br>    JCC L1<br>LCLEAR.1 |

FIG. 1

| Valid | LSET | Addr | Post-Retire | LBID | CEIP |
|---|---|---|---|---|---|
| 1 | 1 | [A] | 1 | 9 | IP0 |
| 1 | 0 | [B] | 1 | 10 | IP1 |
| 1 | 0 | [C] | 1 | 11 | IP2 |

FIG. 3

LCT

| SBID | Valid | LSET |
|---|---|---|
| 40 | 1 | 0 |
| 42 | 1 | 1 |

↑ RET

LPT

| Valid | LSET | Post-Retire | LBID |
|---|---|---|---|
| 1 | 1 | 1 | 72 |
| 1 | 0 | 1 | 129 |
| 1 | 0 | 1 | 130 |

LPT Clearing By LCLEAR

FIG. 5

| Before RLE | After RLE |
|---|---|
| ...<br>COMMIT<br>...<br>LD   [F]<br>LD   [A]<br>LD   [B]<br>LD   [G]<br>...<br>ST   [C]<br>ST   [D]<br>LD   [A]<br>ST   [E]<br>LD   [B]<br>LD   [G]<br>ST   [H]<br>LD   [I]<br>...<br>COMMIT | ...<br>COMMIT<br>...<br>LD       [F]<br>LD.P.0  [A]<br>LD.P.1  [B]<br>LD.P.1  [G]<br>...<br>ST       [C]<br>ST.CL.0  [D]<br>~~LD~~      ~~[A]~~<br>ST.CL.1  [E]<br>~~LD~~      ~~[B]~~<br>~~LD~~      ~~[G]~~<br>ST       [H]<br>LD       [I]<br>...<br>COMMIT |

FIG. 6

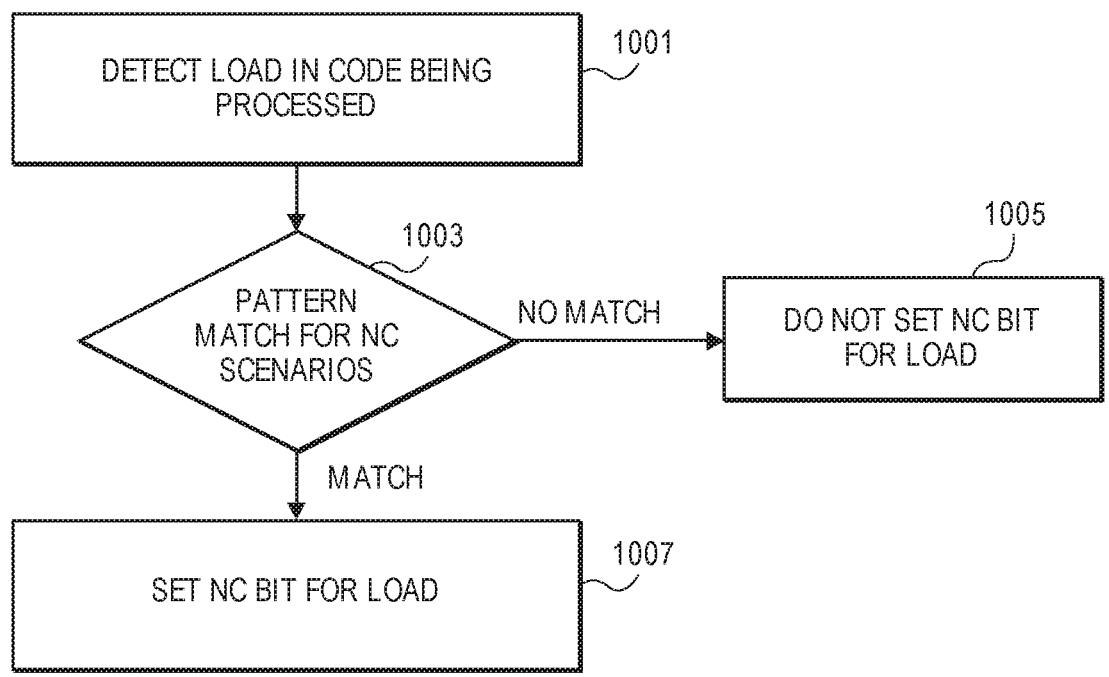

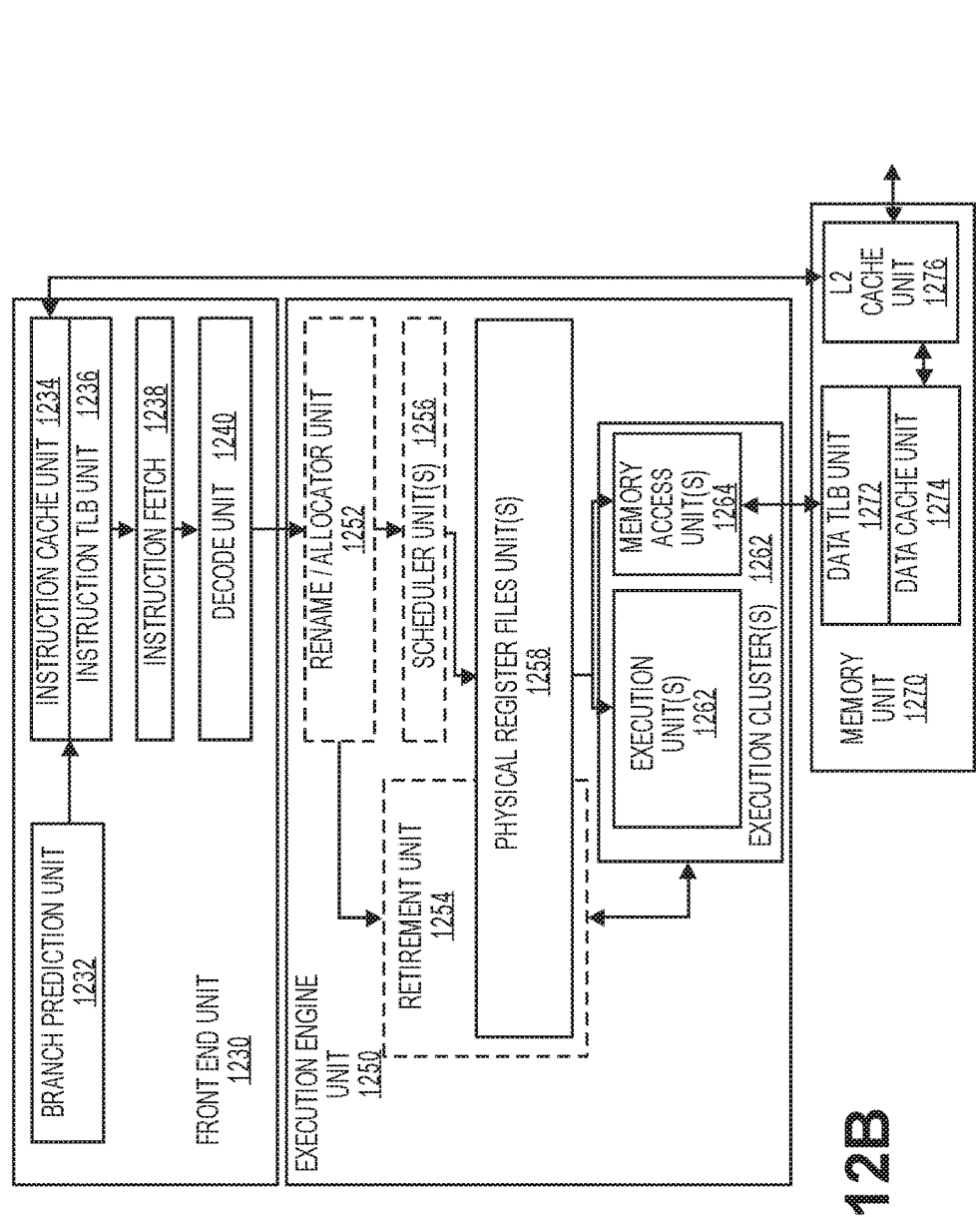

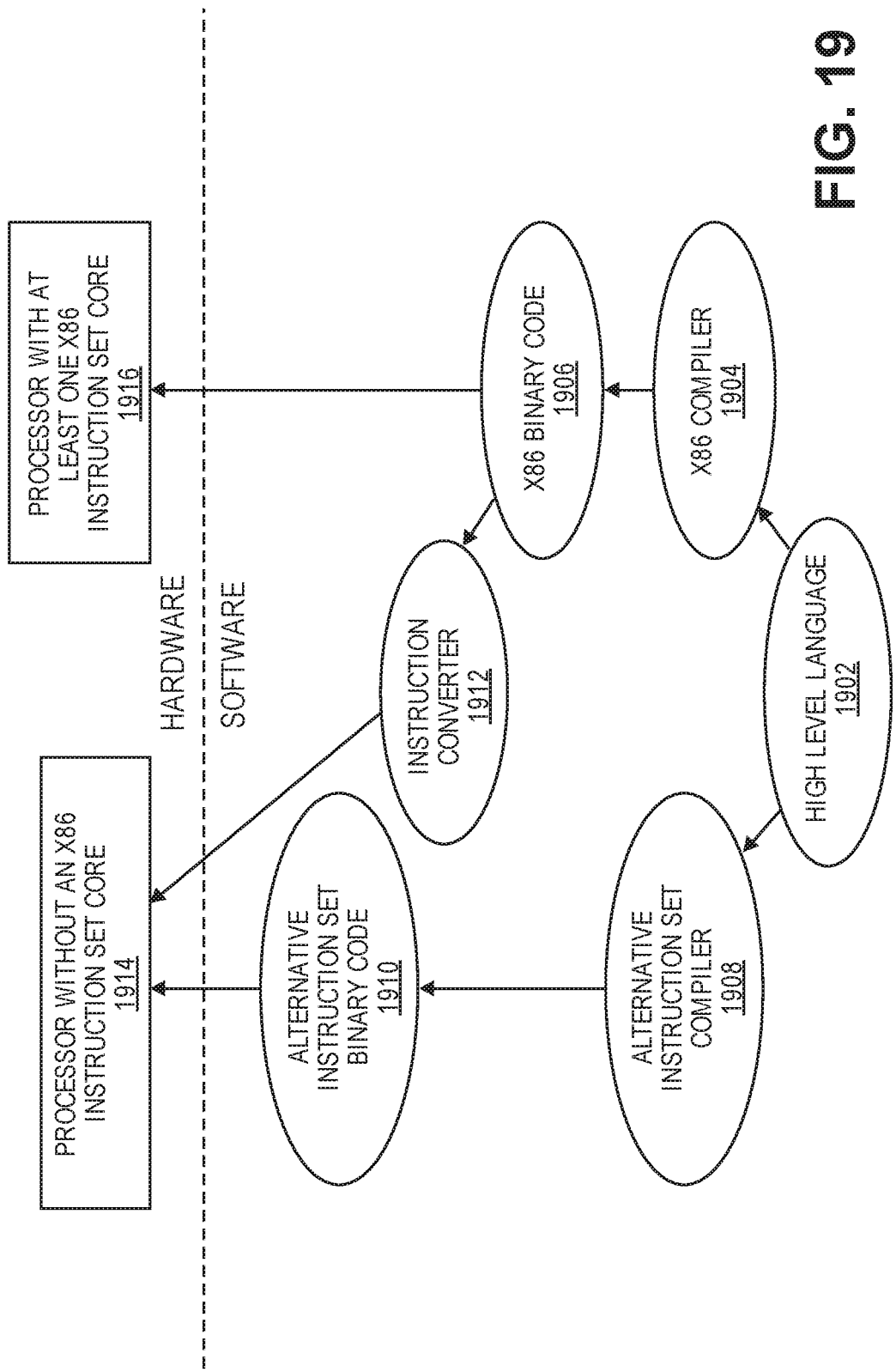

METHOD AND APPARATUS FOR SUPPORTING SPECULATIVE MEMORY OPTIMIZATIONS

TECHNICAL FIELD

Embodiments of the invention relate to the field of relate to run-time optimization of processor execution; and more specifically, to the process for optimizing instruction sequences related to speculative memory accesses.

BACKGROUND

In modern computer architectures a single instruction set architecture (ISAs) is typically implemented in a set of one or more central processing units (CPU). The CPUs execute programs as a set of instructions that have been compiled where the instructions are supported by the single ISA. The compiler optimizes the set of instructions to efficiently run in the ISA. The CPUs load and execute the instructions during runtime.

During runtime execution, the CPUS can process instructions out of order. Out-of-Order execution is a process where the instructions are executed by the CPUs in a different order than the instructions occur in the program. Out-of-order execution could cause some instructions to be scheduled to execute before the inputs of these instructions is available. Thus, the CPUs include scheduling and pipelining logic that enables out-of-order execution to be implemented while minimizing the inefficiency of instruction executions by taking into account the input and output dependencies between instructions in the scheduling of the instructions for out-of-order execution.

BRIEF DESCRIPTION OF THE DRAWINGS

The invention may best be understood by referring to the following description and accompanying drawings that are used to illustrate embodiments of the invention. In the drawings:

FIG. 1 is a diagram of one embodiment of a section of code that has a memory access that is optimized at time of execution.

FIG. 3 is a diagram of one example embodiment of a Loop Invariant Code Motion (LICM) Protection Table (LPT).

FIG. 5 is a diagram of one example embodiment of an LCT and an example interaction with the LPT.

FIG. 6 is a diagram of another speculative load optimization example that is improved by two-way checking between the SB and LB.

FIG. 9 is an example of a loop formation with streaming access.

FIG. 10 is an example flowchart of one embodiment of the BT analysis for reduced CAM checks.

FIG. 12A is a block diagram illustrating both an exemplary in-order pipeline and an exemplary register renaming, out-of-order issue/execution pipeline according to embodiments of the invention;

FIG. 12B is a block diagram illustrating both an exemplary embodiment of an in-order architecture core and an exemplary register renaming, out-of-order issue/execution architecture core to be included in a processor according to embodiments of the invention;

FIG. 13A is a block diagram of a single processor core, along with its connection to the on-die interconnect network 1302 and with its local subset of the Level 2 (L2) cache 1304, according to embodiments of the invention;

FIG. 13B is an expanded view of part of the processor core in FIG. 13A according to embodiments of the invention;

FIG. 15 shown a block diagram of a system in accordance with one embodiment of the present invention;

FIG. 16 is a block diagram of a first more specific exemplary system in accordance with an embodiment of the present invention;

FIG. 17 is a block diagram of a second more specific exemplary system in accordance with an embodiment of the present invention;

FIG. 18 is a block diagram of a SoC in accordance with an embodiment of the present invention; and FIG. 19 is a block diagram contrasting the use of a software instruction converter to convert binary instructions in a source instruction set to binary instructions in a target instruction set according to embodiments of the invention.

DETAILED DESCRIPTION

Figure 2:
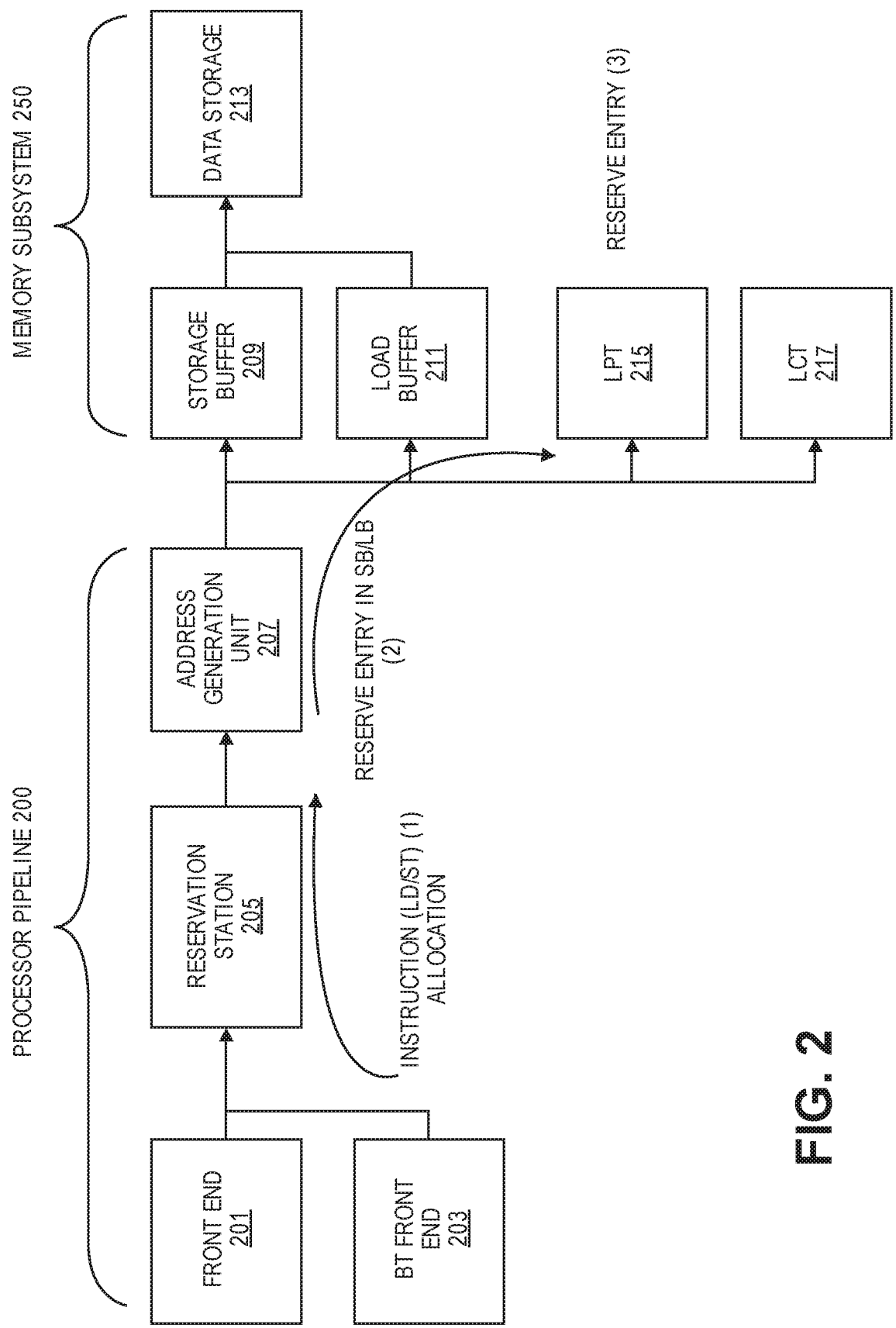
FIG. 2 is a diagram of one example embodiment of a portion of an execution pipeline.

The following description describes methods and apparatus for improving dynamic optimization of memory accesses during execution. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Embodiments address technical issues related to protection of speculative memory instructions. In particular, the embodiments address the protection of speculative memory instructions across atomic region boundaries. Speculative memory optimizations can target a specific atomic region of code that is preserved either in the data cache unit (DCU) or in load buffers or storage buffers (LB/SB). The embodiments provide a process for supporting loop invariant code motion (LICM) optimization in the execution pipeline that will protect the address in a table (LICM Protection Table—LPT) and let all stores and snoops check the table. While the examples and embodiments described herein are with relation to a table (i.e., the LPT), one skilled in the art would understand that other similar structures for storing data can be used, which can be referred to as L protection structures. When a store or snoop hits an LPT protected address, the optimization is identified to be unsafe and subsequently rolled back and corrected. Protecting a read modify write (RMW) LICMed address in the LPT is guaranteed to cause a hit in the LPT for the corresponding store in the loop. This will lead to rollback and correction which is undesirable from performance and power point of view. The embodiments then further enable efficient LICM of RMW loads by making the corresponding RMW related stores not check the LPT to avoid this guaranteed fault. Instead, the address comparison of that store is restricted to other LPT entries. The embodiments have the advantage of a significant reduction in the number of loads executed (and retired) thus reducing the power consumption and improving performance. Further, the embodiments enable LICM of RMW addresses without incurring unnecessary rollbacks and associated power/performance costs.

The embodiments address additional technical problems related to speculative memory optimization. Speculative memory optimizations can require hardware-based checks to ensure correctness of the optimization performed. However, such checks could introduce high overhead impacting performance thereby undermining the optimization and making it less effective. The embodiments provide additional embodiments with low overhead, hardware checking mechanism for speculative memory optimizations. Due to the out-of-order (OOO) nature of current processors, younger stores could execute earlier and try to perform checks on incomplete older loads. Such stores would have to be blocked until the older load completes for the check to be correct. This leads to a high overhead impacting processor performance.

The embodiments overcome these issues by introducing two-way checking between storage buffers (SBs) and load buffers (LBs) where store operations (STs) or microoperations check the LB and load operations or microoperations (LDs) check the SB. While the examples discussed herein are described with relation to microoperations, one skilled in the art would understand that the principles and process are also applicable to operations. This enables the process to avoid blocks on any of the instructions, which reduces overhead and minimizes the effect on processor performance. Some embodiments of the two-way checking include masking mechanisms to reduce the potential for false positives during the OOO execution of two-way checking. The advantages of the two-way checking embodiments include that speculative memory optimizations provide higher performance, at lower energy, than comparable hardware only mechanisms. This helps improve the performance of processors in an energy constrained environment. These embodiments reduce the overhead of implementing speculative memory optimizations.

In other embodiments that are separate from the two-way check process, in the memory execution unit (MEU), load (LD) operations search for appropriate older store (ST) operations to acquire data from, referred to as load forwarding. This is a power-intensive content addressable memory (CAM) operation. LDs cannot skip this check as missing a potential store forward, and fetching data from the data cache unit, could lead to correctness issues as the load might fetch stale data.

The further embodiments provide a process to reduce the CAM operation and power consumption significantly by utilizing dynamic program analysis by a binary translation (BT) process executed in a hardware-software co-designed microprocessor. The BT module analyzes the incoming code stream and identifies LDs that would not potentially benefit from store to load forwarding. Such LDs would be marked with a No-CAM-Check (NC) bit and when these LDs are executed, they will skip loosenet (LN) and finenet (FN) checks and go directly to the DCU to fetch data.

In existing hardware implementations, there is no additional information available to let the LDs skip LN/FN CAM checks. Thus, all LDs have to CAM check the store buffer entries (i.e., perform LN/FN checks). The further embodiments provide a method to reduce the CAM checks for certain LDs that have been identified by a BT module through dynamic program analysis.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

The embodiments provide a process such that speculative memory optimizations across atomic region boundaries are protected against external snoops. A processor pipeline can perform various power efficient optimizations of code prior to execution. One such optimization is relocating loads from loop invariant addresses that inside a loop to a location outside of the loop, this process is referred to herein as loop invariant code motion (LICM). This relocation of load operations in looping code sequences leads to significant reduction in the total number of loads executed. However, supporting this optimization for RMW (Read-Modify-Write) addresses cause correctness issue. The embodiments provide a process to perform LICM optimization that supports RMW addresses.

FIG. 1 is a diagram of an example code sequence that is optimized for LICM. The code sequence in the left-hand column has loads with addresses that are loop invariant. Such loop invariant loads need to be executed only once per loop lifetime and could result in significant power/perf benefits if optimized. In the unoptimized code there are two loops labeled L0 and L1 where the loop L0 is nested within loop L1. There are three load operations within these two loops that are repeated on each iteration of the respective loops. In loop L0, the loads of address [B] and [C] (i.e., LD [B] and LD [C] operations) are repeated with each iteration of the loop L0. In loop L1, the load of address [A] (i.e., LD [A]) is repeated with each iteration of the loop L1.

The LICM optimization moves each of these invariant loads outside of their respective loops such that these loads are executed once before the corresponding loop is initiated. As shown in the right-hand column, the loads of [B] and [C] are moved out of the loop L0. The load of [A] is relocated to a position before the start of loop L1 and executed only once. The loads of [B] and [C] are moved to a location just prior to the start of loop L0. These loads may be executed on each iteration of loop L1 but will no longer be executed on each iteration of loop L0.

FIG. 2 is a diagram of one example embodiment of a portion of a pipeline 200 of a processor in which the LICM optimization process is implemented. The components of the pipeline 200 relevant to the operation of the embodiments are shown. One skilled in the art would appreciate that a processor includes many additional components, which have been omitted for sake of clarity in describing the embodiments. The pipeline 200 is shown connected with a memory subsystem 250. As with the pipeline 200 the components of the memory subsystem 250 relevant to the operation of the embodiments are shown. Other aspects of the memory subsystem 250 are omitted for sake of clarity in describing the embodiments.

The processor pipeline 200 includes at least one front end 201. A front end 201 encompasses fetching, scheduling, branch prediction and similar aspects of pipeline operation. Within the front end 201, a branch predictor predicts the next address to fetch, cache-lines are fetched from the memory subsystem, parsed into instructions, and lastly decoded into micro-ops (uOps). In some embodiments, multiple front ends may be present in the pipeline. For example, a separate front end 203 can perform the same function for a different set of instructions. In the illustrated example, a second front end 203 fetches, parses, predicts and decodes binary translated (BT) instructions where the BT front end 203 operates with a different instruction set architecture (ISA) than the front end 201. In such cases, both of these front ends marshal operations or microoperations for the backend or remainder of the pipeline 200.

The reservation station 205 provides instruction scheduling for the pipeline 200. The front ends 201/103 and reservation stations 205 are further discussed herein below with reference to FIG. 12B (front end 1230 and allocation units 1252). The reservation station 205 manages information about instructions waiting or ready to issue. The reservation station 205 also manages register renaming. When an instruction access the memory subsystem 250, the address generation unit (AGU) 207 calculates the address in the memory subsystem to enable access of the data utilized by a microoperation. The data to be accessed in the memory subsystem 250 is stored in the data storage 213 also referred to as the main memory. The data storage 213 can be any type of dynamic or static random-access memory device or set of such devices. The data storage 213 can encompass multiple levels of hierarchical caches and data stores that are not detailed here for sake of clarity.

Microoperations that are storing data in the data store 213 can be buffered or organized in the storage buffer 209 also referred to as the storage queue. Similarly, microoperations that are loading data from the data store 213 can be buffered or organized in the load buffer 211 also referred to as the load queue. These buffers hold store and load operations that have not been retired to the data storage 213 and will be retired in program order. These load and store operations can have interdependencies that are resolved before retirement.

An LPT is a table, discussed further herein below that tracks information related to code sequences that have been optimized using LICM. Similarly, the load clear table (LCT) is a table that tracks information related to the LICM, specifically for tracking resolution of LICM Clear microoperations as discussed further herein below. While the example embodiments describe a load clear table, one skilled in the art would understand the functions of the LCT can be implemented as other structures, referred to herein as load clear structures.

The diagram illustrates the basic flow of load and store instructions. A load or store instruction provided by one of the front ends is allocated into the reservation station 205 (step 1). The address related to the load or store is computed by the AGU and an entry is made in the store buffer or load buffer for the store/load operation (step 2). An entry is also created in the LPT 215 to track LICM related information as detailed further herein below.

The LPT 215 is utilized to prevent accesses from loads or stores that are external to the optimized code sequence. If some internal or external store writes to the same address as the relocated load while the associated loop is executing, the relocated load needs to be re-executed to get the updated data. The embodiment provide a process to detect such a situation and correct the program execution. The embodiments use the LPT to detect these situations. The LPT can be a hardware table accessible to the pipeline. The LPT stores the addresses and other details of the LICMed loads during the lifetime of the loop from which they were relocated. A high-level structure of an example LPT is illustrated in FIG. 3.

FIG. 3 is a diagram of one example embodiment of an LPT. The illustrated example of FIG. 3 is based on the code optimized in FIG. 1. The LICMed loads from the example in FIG. 1 are preserved during the lifetime of the respective loops for internal stores and external snoops to check against. A snoop is a check for a requested data in a cache hierarchy, bus or similar component of the computer architecture. If one of such checks match (address alias), the optimization faults, and corrective measures are taken as part of the fault handling.

In the example LPT, the first entry is for the relocated load of address [A] in loop L1. The entry includes the loaded address [A], a valid bit to indicate if the entry is valid/current, an LICM Set (LSET) bit to indicate a unique ID for the LICMed load, a post-retire bit to indicate the status of retirement of the load, a Load Buffer ID (LBID) bit to indicate the ID of the load buffer occupied by the LICMed load, and a Compressed EIP (CEIP) to indicate IP/PC of the load.

Each time a snoop or store is retired in the pipeline a check is made of the associated address to determine if there is a match in the address field of the LPT. If a match is found and the matched entry is valid, then the optimization is deemed unsafe and rolled back. Steps are taken in the Dynamic Optimization process to avoid this in the future.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4:
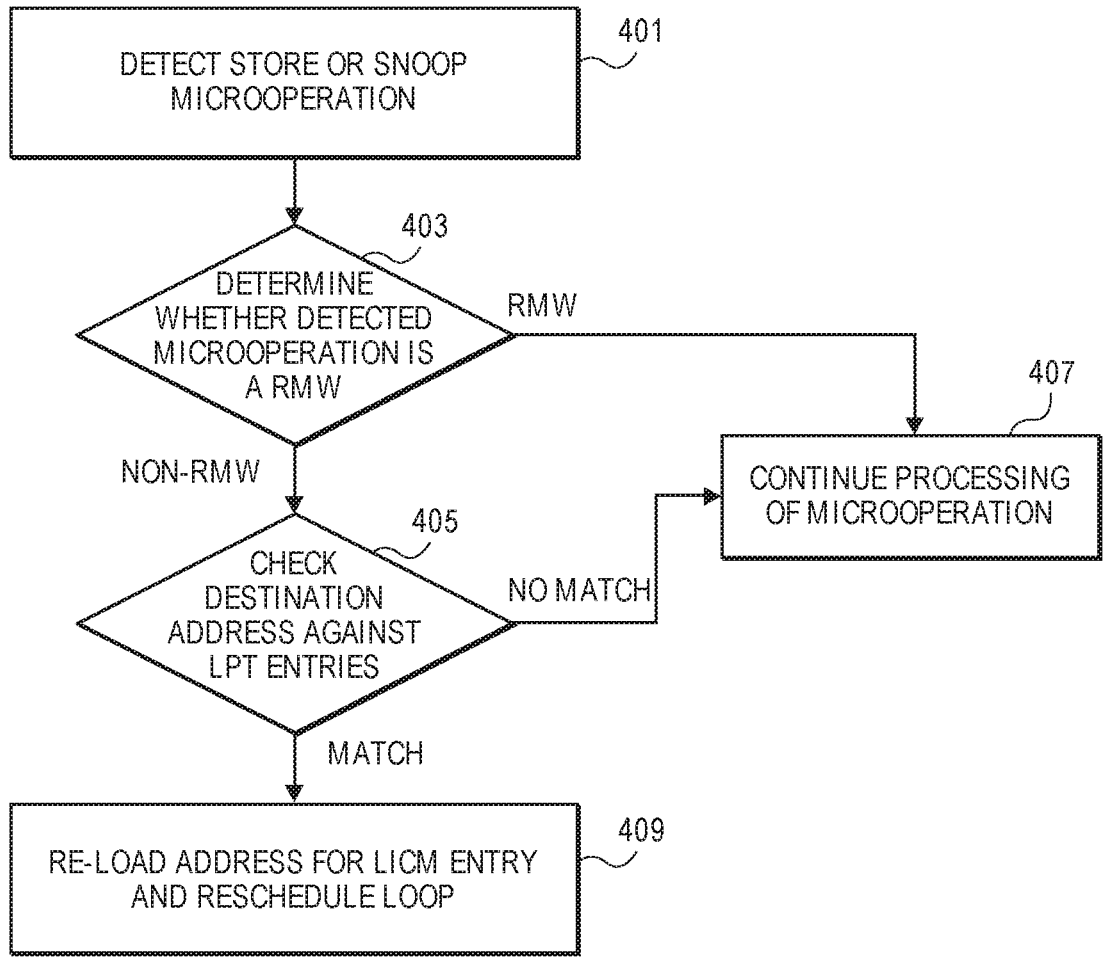
FIG. 4 is a diagram of one embodiment of a load clear table (LCT) operation.

FIG. 4 is a flowchart of one embodiment of the process of checking an LPT. This process can be executed by the reservation station, AGU, or similar component of the pipeline or any combination thereof. The process can be triggered by detection of a store or snoop microoperation in the pipeline (Block 401). For example, if a store to an address [A] (i.e., store [A] microoperation) is detected, then the process is triggered.

The component executing the process determines whether the microoperation is a read modify write (RMW) sequence in the same loop as the load (Block 403). The RMW can be detected by the Binary Translation SW that identified a matching store to the same address as an LICMed load in the loop. However, normal LPT checking for such stores is guaranteed to match with the corresponding load's LPT entry. To avoid such faults, if a RMW is determined, then the triggering store microoperation is not matched to the corresponding RMW LPT entries to determine whether the load instruction is to be rolled back. Instead, the store is dispatched and the load is not affected (Block 407). If the trigging microoperation is not a RMW, then the process checks the address of the snoop or store against the LPT entries (Block 405). If there is no match of the address for the triggering microoperation and any LPT entry, then the pipeline continues with the processing of the triggering microoperation without any effect on the loads tracked by the LPT (Block 407). However, such RMW stores address compare against non-RMW loads in LPT though.

If the address accessed by a triggering microoperation does have an address that matches a valid entry in the LPT, then the load instruction corresponding to that entry is re-loaded and the LICM is rolled back such that the loop is rescheduled and re-executed in its pre-LICM state (Block 409). In other embodiments, the value derived from the load may be updated in light of the store operation or other similar remedies are implemented to correct for the external store or snoop operation on the loop that has been optimized by LICM.

In one embodiment, once the execution exits the loop, the protection is removed by a specific instruction (e.g., LCLEAR) so that the process does not continue to check for matches of the LPT entry for that loop or relocated load. The embodiments provide performant functioning of LICM optimization under out-of-order (OOO) execution with several optimizations. Relocated LICMed loads can install their address to an LPT entry on reservation station dispatch so that stores can check against these addresses as soon as possible. As discussed further herein below, the LPT entries can also participate in checking the SB during their lifetime in LB (e.g., as part of two-way checking between LB and SB as described herein below). False positives during OOO checking are handled by imposing a re-checking during the retirement (@ret) of the stores.

In some embodiments, an additional structure called the LICM Clearing Table (LCT) is provided to optimize the clearing action of LCLEAR instructions which would have to block @ret otherwise to enable functionally correct LPT clearing.

FIG. 5 is a diagram of one example embodiment of an LCT and an example interaction with the LPT. As illustrated the LCT can include a set of entries with each entry including the LCLEAR's Store Buffer ID (SBID), a valid bit, and an LICM Set (LSET) value of the LCLEAR. The LCT hold a set of entries with an entry for each of the clearing LCLEAR instructions, similar to LPT holding LIC-Med loads. When the Store Buffer retire pointer moves, indicating the retirement of the LCLEAR, information in LCT is read by a pipeline hardware (e.g., a specialized circuit, or logic in existing structures) and corresponding LPT entries, matching the LSET, are cleared. This avoids the overhead associated with LCLEAR @ret action.

FIG. 6 is a diagram of another speculative load optimization example that is improved by two-checking between the SB and LB. In the additional embodiments, the pipeline can implement additional dynamic run-time speculative memory optimizations such as redundant load elimination (RLE) as shown in FIG. 6. In this example optimization, the initial code sequence includes redundant loads (e.g., multiples of LD [A], LD [B], and LD [G]). The RLE optimization eliminates the subsequent loads. However, since there are intermediate stores (ST [C], ST [D], ST [E]), alias detection has to be performed.

The RLE optimization annotates the eliminated LDs with a flag (e.g., a 'P' flag) to indicate that they have to be protected and checked by subsequent stores. The last store at which the speculation ends (i.e., ST [D] for LD [A], and ST [E] for LD [B]) clears the specific protection so that younger stores do not accidentally check and fault as it would be a false or unnecessary fault.

The embodiments provide integrated alias checking with efficient hardware-based checking that can be performed by extending the existing memory disambiguation (MD) check mechanism to check speculation from the RLE optimization and similar dynamic memory speculation optimizations.

Figure 7:
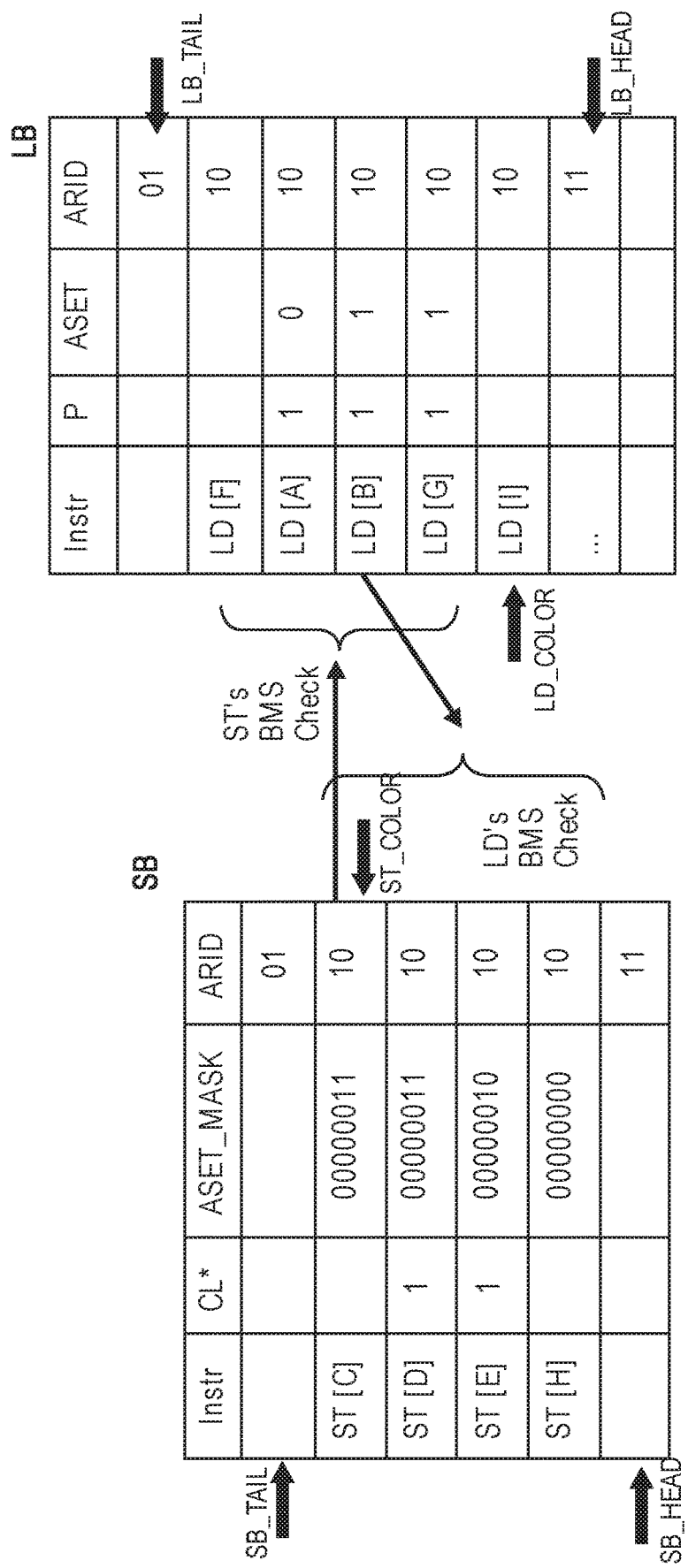
FIG. 7 is a diagram of one example embodiment of the improved memory disambiguation check.

FIG. 7 is a diagram of one example embodiment of the improved memory disambiguation check. The process operates by having LDs check younger STs in SB, and STs check older LDs in LB for optimization checking. This is exactly the opposite of existing memory disambiguation (MD) checks, thus enabling the optimization checking to use the inverse mask of MD checking for optimization checking. Optimization checking can be done in out of order (OOO) fashion during execution without loss of correctness. Since there's two-way checking, it is guaranteed that any aliasing LD-ST pair would check against each other to identify the aliasing, no matter in what order they execute. This helps reduce the performance penalty of alternate mechanisms that block stores for correctness, when older loads are incomplete, during OOO execution.

The optimization checking mechanism assumes LB/SB based memory atomicity where all the loads and stores are retained in the LB and SB until an atomic region completes and these speculative memory optimizations are limited to atomic region boundaries. Two-way optimization checking during OOO execution creates situation where false positive aliasing is possible. The primary example is where a load raises alias fault on younger store, however, the store is in the wrong path thus resulting in a false positive error. The embodiments include several lightweight techniques to reduce the potential for false positives.

The illustrated SB includes a set of entries, with an entry for each instruction to be processed. The fields of the entries include the instruction field (Intst) that contains the instruction, a CL* field, an ASET_MASK field, and an atomic region ID (ARID) field. The ARID is a color (i.e., one of a set of labels) assigned at the time of allocation to each atomic region and used during these MD optimization checks. Since the MD optimization checks are for optimizations within an atomic region, the load and store have to be of matching ARID. The ASET_MASK is a bitmask assigned to each store at time of allocation representing every active Alias Sets (ASETs) at that point of time. ASETs indicate the speculation region associated with each speculated load/store. Hence, the mask indicates all the ASETs that this store should check (or be checked against). All stores and/or loads that match during OOO checking are designated as rechecks at retirement. On an aliasing match during OOO execution, these loads or stores are blocked at retirement and the check is performed again. This reduces the chance of false positives as it lets older loads drain (for stores); and younger stores resolve wrong path execution (for loads).

The illustrated LB similarly includes a set of entries, with each entry for each instruction to be processed. The fields of the entries include the instruction field (Intst) that contains the instruction, a P field, an ASET field, and an atomic region ID (ARID) field. As with the SB, since the MD optimization checks are for optimizations within an atomic region, the load and store have to be of matching ARID. The ASET is an ID assigned to a region of speculation. For example, in Figure F, LD [B] and LD [G] have been speculated over same stores and hence they get the same ASET (1) whereas, LD [A] gets a different ASET (0). A set of stores and/or loads are designated as rechecks at retirement if they observe address matching during OOO execution. On an aliasing match during OOO execution, these loads or stores are blocked at retirement and the check is performed again. This reduces the chance of false positives as it lets older loads drain (for stores); and younger stores resolve wrong path execution (for loads).

Figure 8:
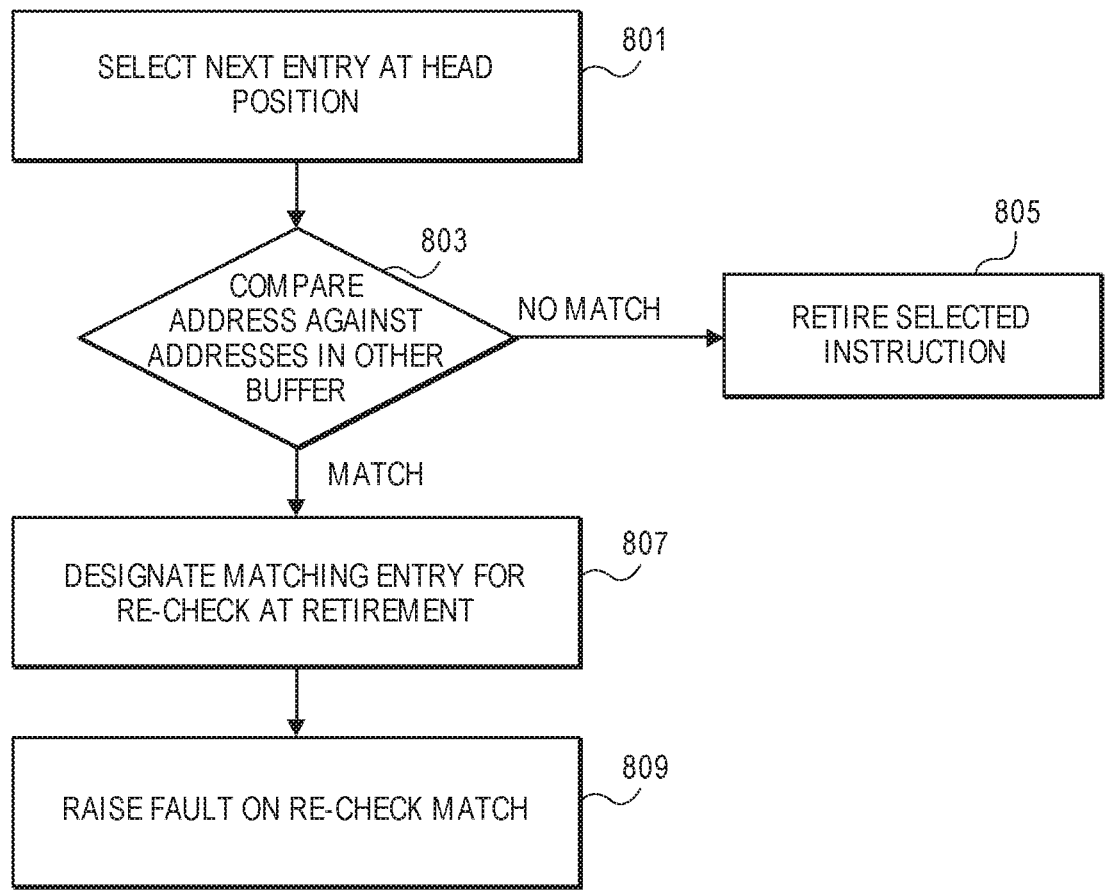
FIG. 8 is a flowchart of the operation of the two-way checking process.

FIG. 8 is a flowchart of the operation of the two-way checking process. The process can be implemented by specialized logic, by retirement logic, or other component of the pipeline or any combination thereof. The process is described as generic to the handling of the execution of stores or loads in the SB/LB respectively with clarifying differences described herein. The process is triggered as the store or load is inserted into SB or LB for its execution in the memory unit (Block 801). The store or load from the selected entry has its address compared against the entries of the other buffer (i.e., a selected store instruction address is compared to load addresses in the LB and a selected load instruction addresses is compared to store addresses in the SB). Load instruction addresses can be compared to younger store instruction addresses in the SB. Younger store instructions are identified by their store color (SB ID) which is younger (larger) than the loads' own store color. Store instruction addresses can be compared to older load instruction addresses in the LB. Older load instruction addresses can be identified the same way by comparing their respective load colors (LB ID). If no matching addresses are found in the other buffer, then the selected instruction can be retired (Block 805). However, if a match is found then the matching instruction can be designated for re-check at retirement (Block 807). An instruction designated for re-check will determine its retirement whether the alias was resolved or whether the instruction and its region must be re-executed. A fault can be raised in cases where a match is made during recheck (809).

This checking compliments the existing memory disambiguation checks that support out-of-order (OOO) execution of memory instructions and store to load data forwarding. In existing checks, loads check older stores (for forwarding) and stores check younger loads (to check correctness of OOO execution). The above-mentioned checks can be implemented by extending the existing checks. This way the embodiments provide an efficient process to perform speculative memory optimizations.

In other embodiments separate from or the two-way check process, LD operations search for appropriate older store (ST) operations to acquire data from, referred to as load forwarding. This load forwarding process can be implemented in the MEU during the memory disambiguation (MD) checks. This is a power-intensive content addressable memory (CAM) operation. LDs cannot skip this check as missing a potential store forward, and fetching data from the data cache unit, could lead to correctness issues as the load might fetch stale data.

The further embodiments provide a process to reduce the CAM operation and power consumption significantly by utilizing dynamic program analysis by a binary translation (BT) module in a hardware-software co-designed microprocessor. The BT module analyzes the incoming code stream and identifies LDs that would not potentially benefit from store to load forwarding. Such LDs would be marked with a No-CAM-Check (NC) bit and when these LDs are executed, they will skip loosenet forwarding CAM checks and go directly to the DCU to fetch data.

In existing hardware implementations, there is no additional information available to let the LDs skip forwarding CAM checks. Thus, all LDs have to CAM check the store buffer entries (i.e., perform forwarding CAM checks). The further embodiments provides a method to reduce the CAM checks for certain LDs that have been identified by a BT module through dynamic program analysis.

Although the performance benefit from store-to-load (S2L) forwarding in MEU is significant, it has been observed that only about 10% of LDs are involved in S2L forwarding on average in client applications. This number is even smaller in server applications (6%). Thus, there is high power saving potential if the remaining LDs could skip store buffer (SB) CAM checks. However, traditional microprocessors do not have enough information to let the LDs skip the CAM check.

A processor that can perform dynamic analysis of the code stream using a BT module can identify LDs that are unlikely to benefit from S2L forwarding from a store currently in the SB. Several such code scenarios exist such as streaming accesses and other loop formations.

FIG. 9 is an example of a loop formation with streaming access. The LD in FIG. 9 will not benefit from S2L forwarding and hence need not check the SB CAMs. The BT analysis can mark such LDs with a No-CAM-Check (NC) bit that lets the MEU cluster know that this is a special LD that should directly fetch from the DCU.

BT analysis can be configured to identify many potential NC LDs. There can be LDs that, from BT perspective, "may alias" with some older stores and hence benefit from S2L forwarding. For example, BT analysis might not be able to accurately predict due to issues such as addressing format differences. Another scenario is where a LD benefits from a store in a previous translation, but it is too close in the execution window to forward, which the BT does not have visibility of. In such scenarios, BT analysis can be conservative and skip such LDs from being marked NC. However, with specific hardware support for checking and pessimization, such LDs could be marked NC to save power.

For example, such NC LDs could check a small bloom filter (BF) with compressed ST addresses before performing forwarding CAM checks. If the LD hits the BF, it proceeds with full forwarding CAM checks. Otherwise, it skips those CAM checks. This might add a phase to the memory pipeline which can be tolerated without much performance degradation. By using generational BF, false positives could be limited by clearing the BFs every 70 STs or so (size of SB). Another option is to perform a CAM check, e.g., bits [11:8], and proceed with full forwarding CAM checks if [11:8] match.

If an NC LD is identified to benefit from S2L forwarding, the NC bit can be flipped in hardware to avoid the issue in future. Thus, the optimization could be reversed after first failure to avoid recurring failures in future.

Processor that executed memory operations out of order, and allow for bypassing of data among memory operations, could benefit from this CAM optimization. Additionally, any processor that uses dynamic binary translation would find this process useful to improve performance further with other dynamic optimization techniques. With the increasing emphasis on power consumption, many mobile processor designers can utilize hardware-software co-designed processors including this optimization.

FIG. 10 is an example flowchart of one embodiment of the BT analysis process for reduced CAM checks. This process can be implemented in the BT front end described herein above. The BT front end would provide the NC bit to the MEU or similar logic in the pipeline to enable the skipping of the CAM check.

The BT analysis would be implemented in the overall translation and optimization process of BT as described further herein below. The BT would pattern match for each load instruction (Block 1001) to identify the patterns in the code sequence where the load would not benefit from a non-check of the CAM (i.e., the SB) (Block 1003). Such patterns would include streaming access cases as shown in Figure J. If any of these cases are found, then the NC bit for the load instruction is set. If these cases are not found, then the NC bit is not set. The NC bit will subsequently be utilized by the MEU to determine whether the SB is checked for the LD when it is processed in the LB.

Figure 11:
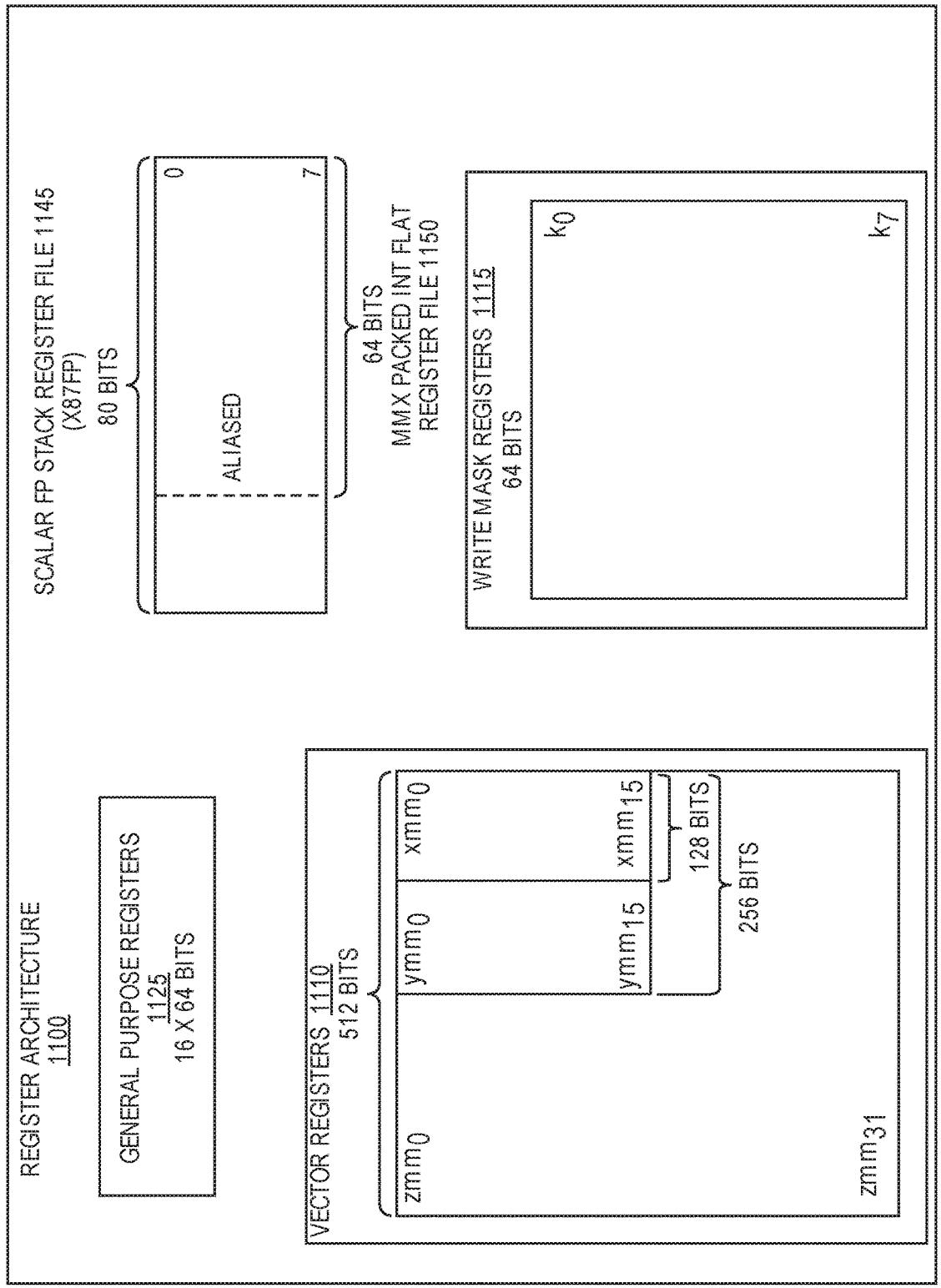
FIG. 11 is a block diagram of a register architecture 1100 according to one embodiment of the invention.

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13B:
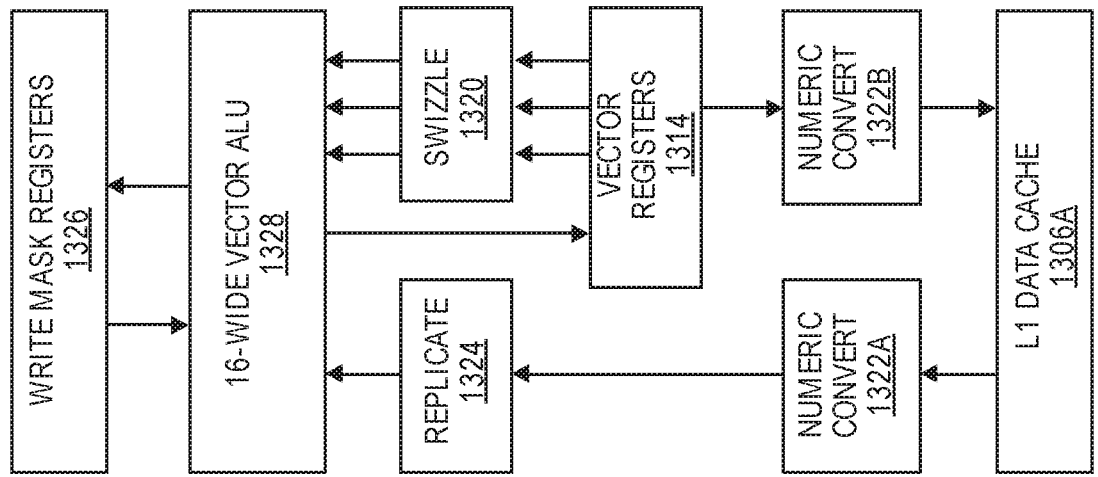
FIGS. 13A-B illustrate a block diagram of a more specific exemplary in-order core architecture, which core would be one of several logic blocks (including other cores of the same type and/or different types) in a chip.
Figure 13A:
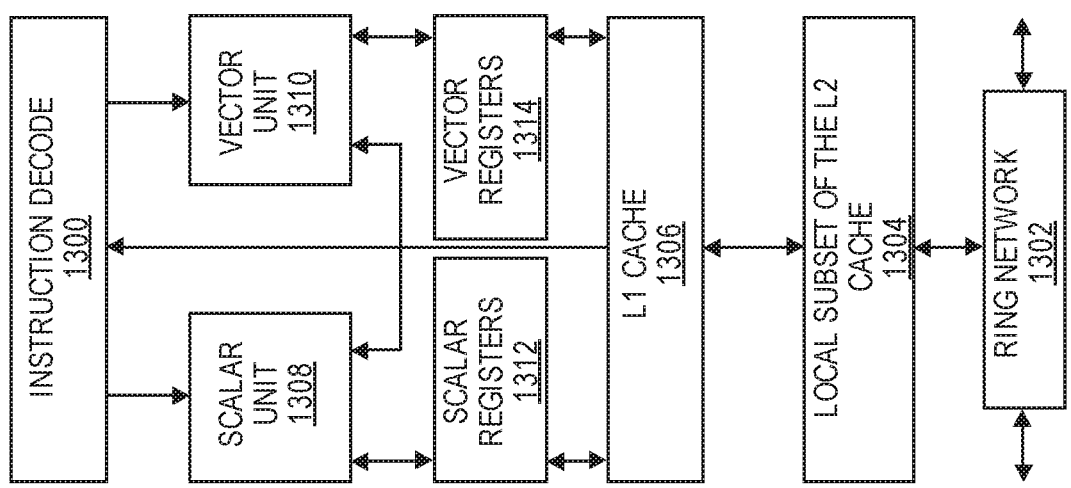

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
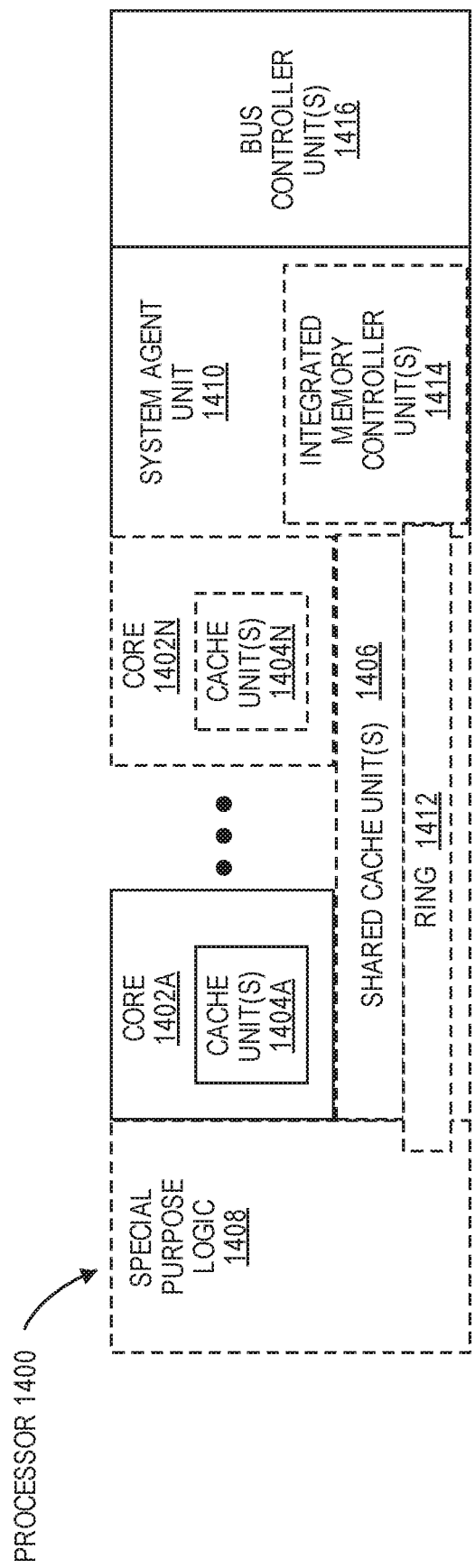
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
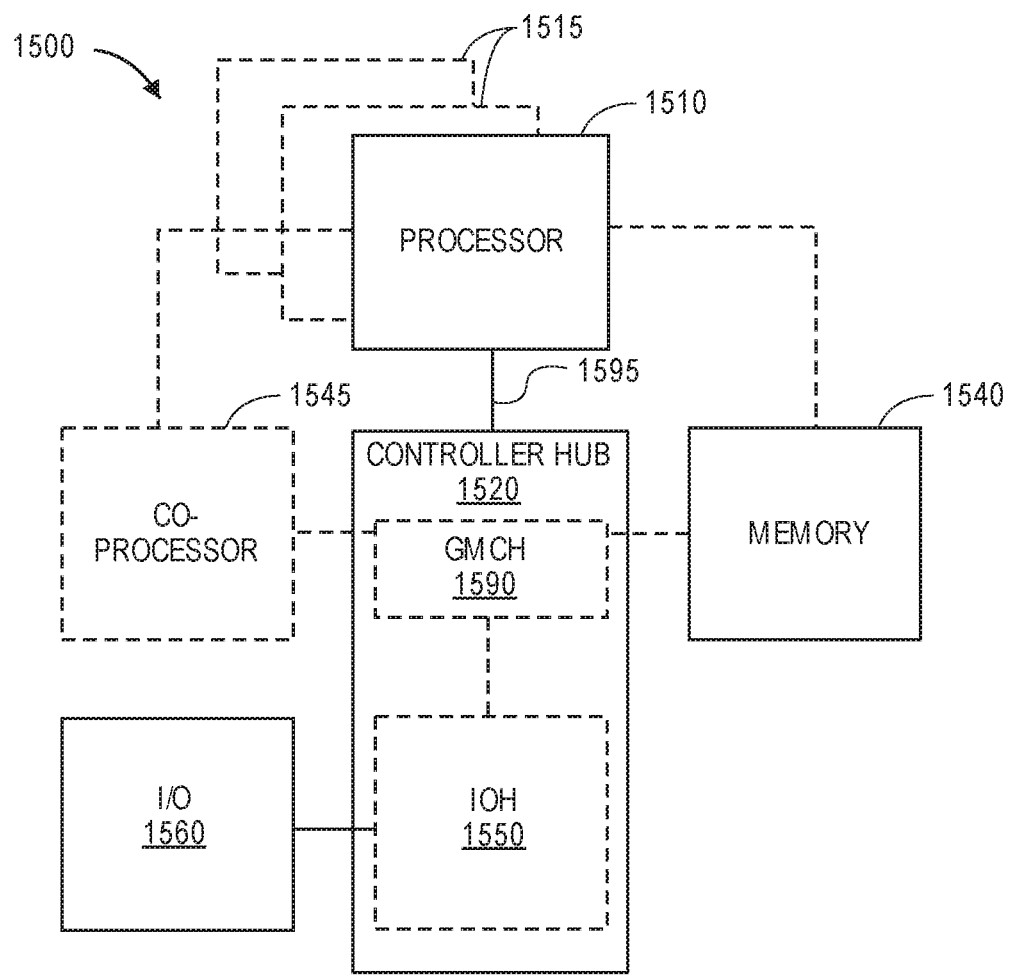
FIGS. 15-18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
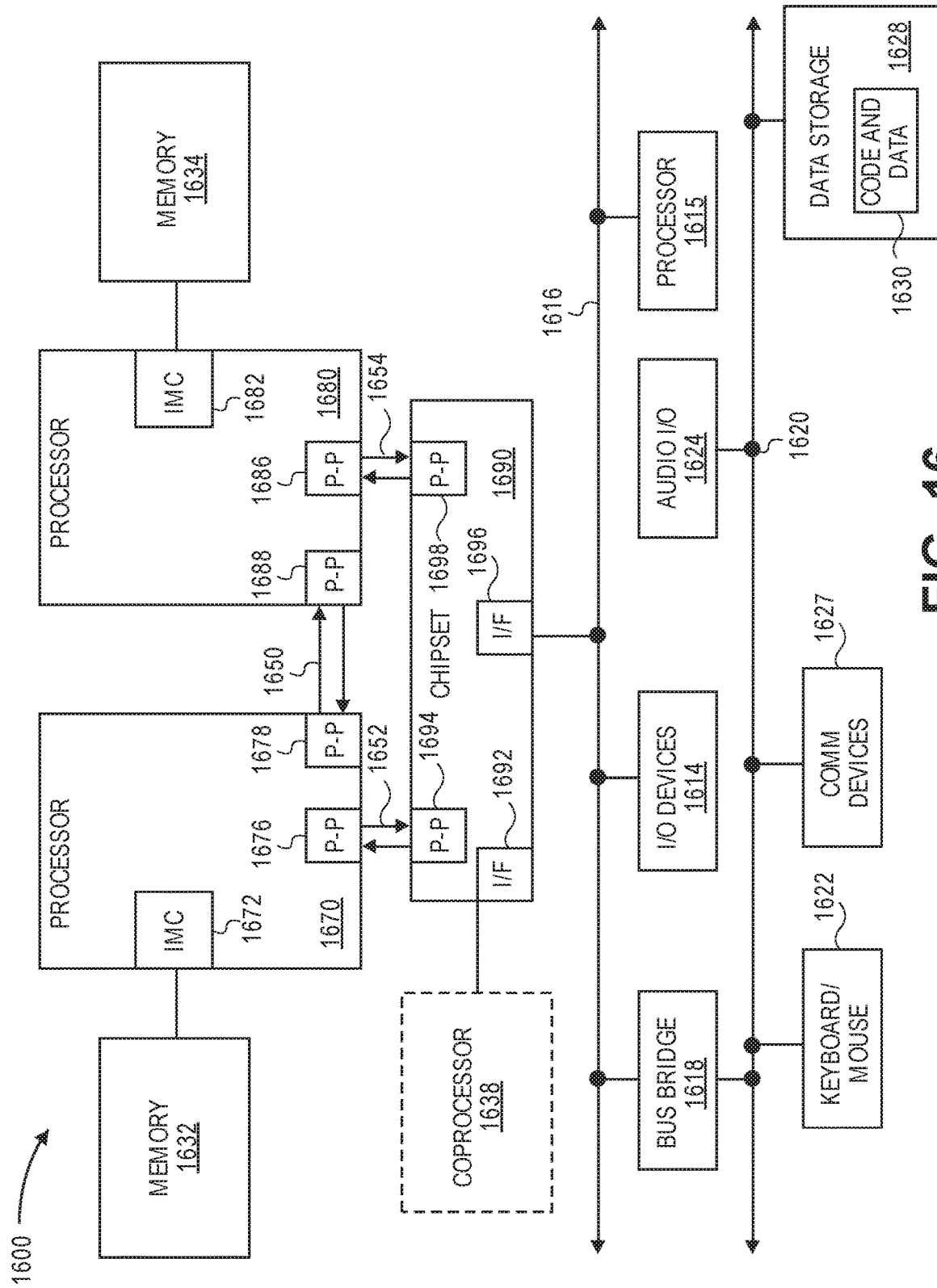

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
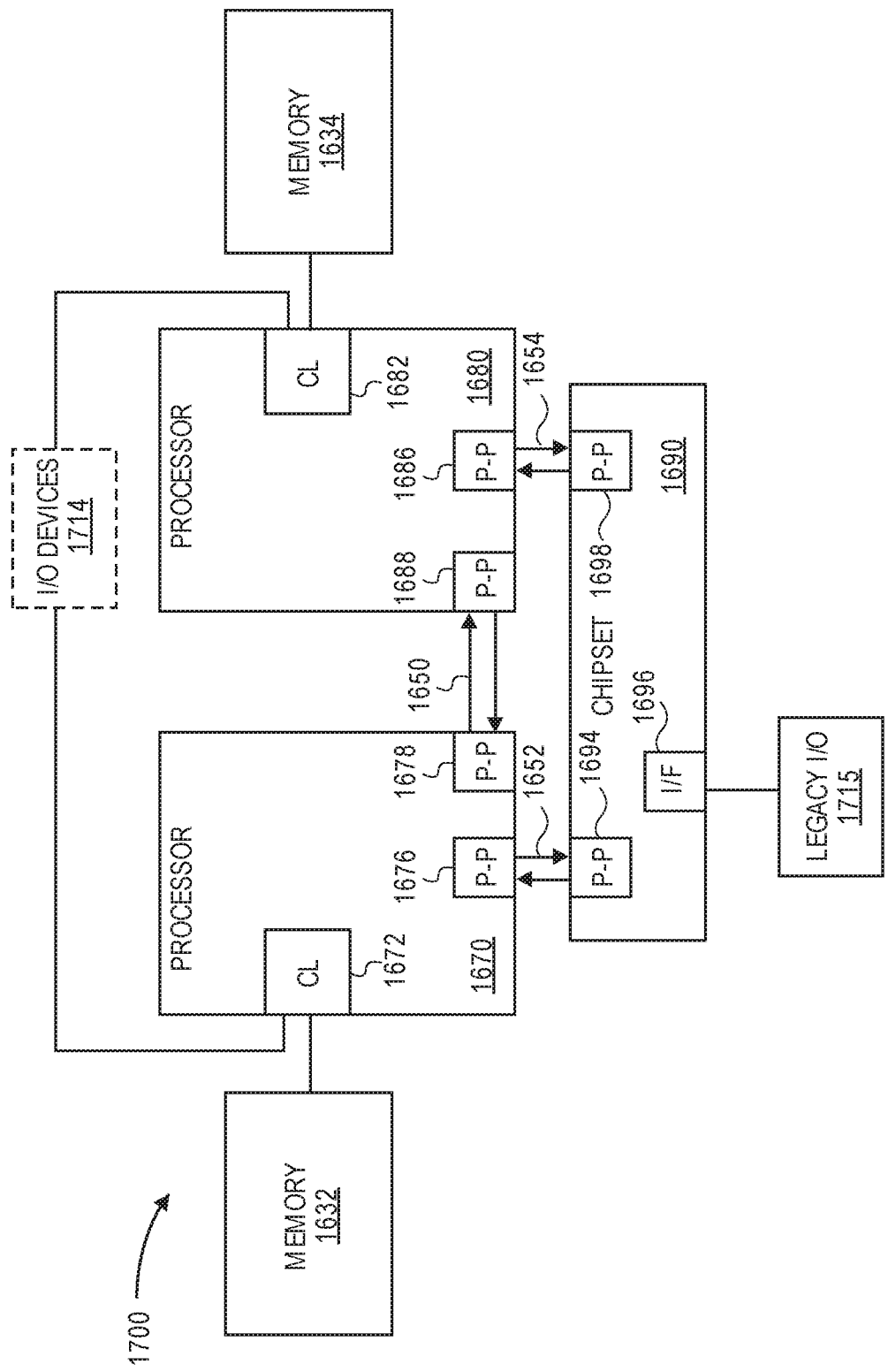

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
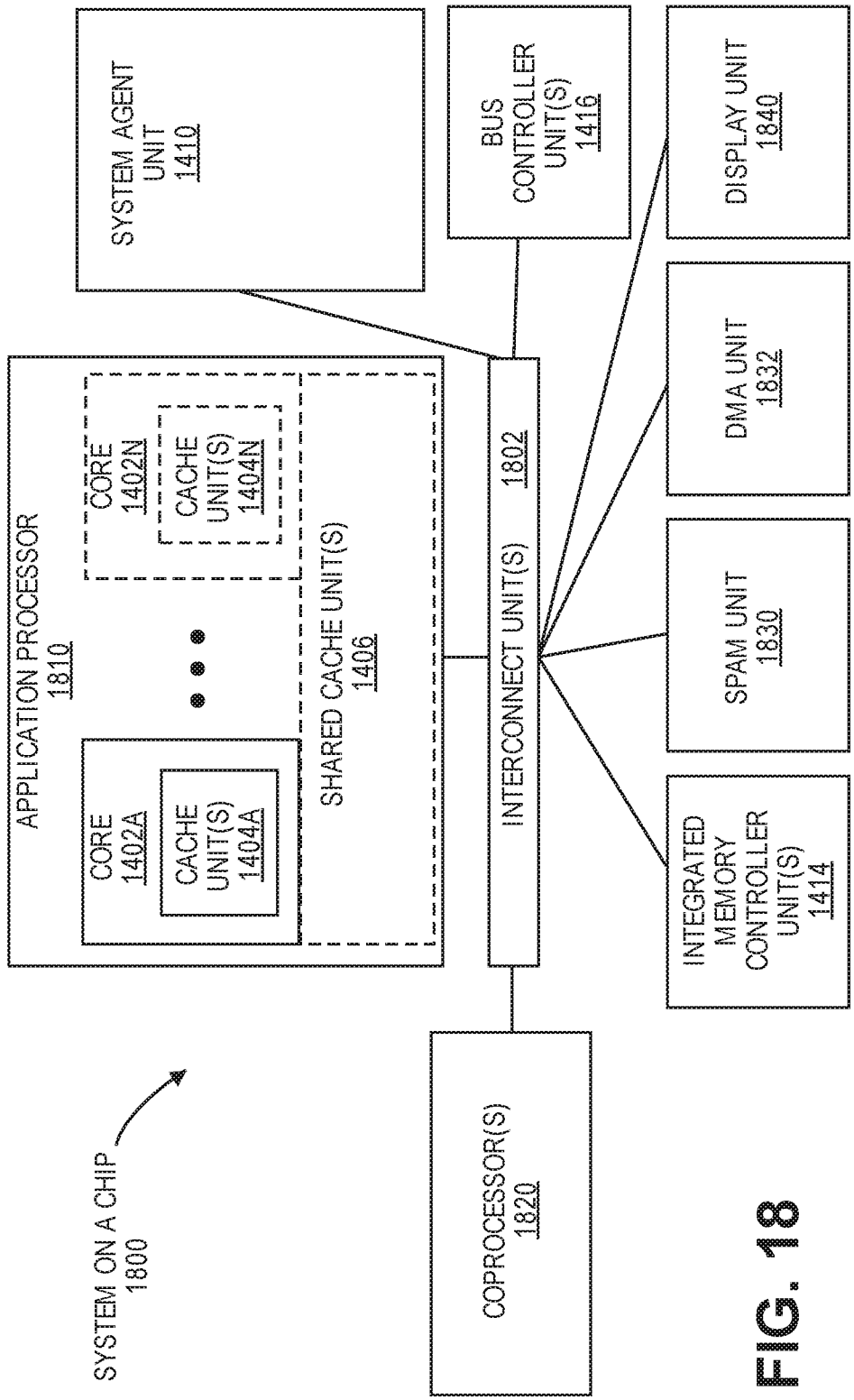

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
    a store buffer to store store instructions to be processed to store data in main memory;
    a load buffer to store load instructions to be processed to load data from main memory;
    a loop invariant code motion (LICM) protection structure coupled to the store buffer and the load buffer, the LICM protection structure to track information to compare an address of a store or snoop microoperation with entries in the LICM protection structure; and
    an address generation unit (AGU) coupled to the LICM protection structure, the AGU to check whether a store or snoop operation is in a read modify write (RMW) sequence, the AGU to bypass the LICM protection structure for a matching entry in a check of the LICM protection structure for a detected RMW sequence.

2. The processor of claim 1, wherein the LICM protection structure includes fields for each entry of any one or more of a valid bit, LSET bit, address, post-retirement bit, load buffer identifier, and CEIP.

3. The processor of claim 1, wherein the AGU is further to check, where an RMW sequence is not detected, whether the store or snoop operation has a destination address that is in one of a plurality of entries of the LICM protection structure, and to re-load a load operation of one of the plurality of entries that matches the destination address.

4. The processor of claim 1, further comprising:
    a front end communicatively coupled to the LICM protection structure, the front end to optimize a code sequence with LICM and allocate and entry for an optimization in the LICM protection structure.

5. The processor of claim 1, further comprising:
    a load clear structure coupled to the LICM protection structure, the load clear structure to track retirement of load clear microoperations that identify a completion of an LICM sequence.

6. The processor of claim 1, wherein the store buffer and the load buffer are to perform two-way checks with the load buffer to compare retiring loads to younger stores and the store buffer to compare retiring stores with older loads to ensure memory disambiguation coherency.

7. The processor of claim 1, further comprising:
    a binary translation front end to identify load instructions that can bypass a store buffer check for load forwarding.

8. A computer system comprising:
    a main memory; and
    a system on a chip coupled to the main memory, the system on a chip including a processor including a pipeline with a store buffer to store store instructions to be processed to store data in main memory, a load buffer to store load instructions to be processed to load data from main memory, a loop invariant code motion (LICM) protection structure coupled to the store buffer and the load buffer, the LICM protection structure to track information to compare an address of a store or snoop microoperation with entries in the LICM an address generation unit (AGU) coupled to the LICM protection structure the AGU to check whether a store or snoop operation is in a read modify write (RMW) sequence, the AGU to bypass the LICM protection structure for a for a matching entry in a check of the LICM protection structure for a detected RMW sequence.

9. The computer system of claim 8, wherein the LICM protection structure includes fields for each entry of any one or more of a valid bit, LSET bit, address, post-retirement bit, load buffer identifier, and CEIP.

10. The computer system of claim 8, wherein the AGU is further to check, where an RMW sequence is not detected, whether the store or snoop operation has a destination address that is in one of a plurality of entries of the LICM protection structure, and to re-load a load operation of one of the plurality of entries that matches the destination address.

11. The computer system of claim 8, further comprising:
a front end communicatively coupled to the LICM protection structure, the front end to optimize a code sequence with LICM and allocate and entry for an optimization in the LICM protection structure.

12. The computer system of claim 8, further comprising:
a load clear structure coupled to the LICM protection structure, the load clear structure to track retirement of load clear microoperations that identify a completion of an LICM sequence.

13. The computer system of claim 8, wherein the store buffer and the load buffer are configured for two-way checks with the load buffer comparing retiring loads to younger stores and the store buffer comparing retiring stores with older loads to ensure memory disambiguation coherency.

14. The computer system of claim 8, further comprising:
a binary translation front end to identify load instructions that can bypass a store buffer check for load forwarding.

15. A non-transitory computer readable medium having stored therein a set of instructions, which when executed cause a computer to perform a set of operations comprising:
storing store instructions in a store buffer to be processed to store data in main memory;
storing load instructions in a load buffer to be processed to load data from main memory;
identifying a loop invariant code motion (LICM) in a code sequence;
updating a LICM protection structure to track information about the LICM in the code sequence;
comparing an address of a store or snoop microoperation with entries in the LICM; and
checking whether the store or snoop operation is in a read modify write (RMW) sequence to bypass the LICM protection structure for detected RMW sequences.

16. The non-transitory computer readable medium of claim 15, further comprising:
checking, where a read modify write (RMW) sequence is not detected, whether the store or snoop operation has a destination address that is in one of a plurality of entries of the loop invariant code motion (LICM) protection structure, and to re-load a load operation of one of the plurality of entries that matches the destination address.

17. The non-transitory computer readable medium of claim 15, further comprising:
optimizing a code sequence with LICM; and
allocating an entry for the optimization in the LICM protection structure.

18. The non-transitory computer readable medium of claim 15, further comprising:
tracking retirement of load clear microoperations that identify a completion of an LICM sequence.

19. The non-transitory computer readable medium of claim 15, further comprising:
performing two-way checks by comparing retiring loads to younger stores and comparing retiring stores with older loads to ensure memory disambiguation coherency.

20. The non-transitory computer readable medium of claim 15, further comprising:
identifying load instructions that can bypass a store buffer check for load forwarding.

\* \* \* \* \*